United States Patent
Stanjek et al.

(10) Patent No.: US 7,875,658 B2
(45) Date of Patent: *Jan. 25, 2011

(54) EXPANSIBLE MIXTURES DEVOID OF ISOCYANATES EXHIBITING IMPROVED FIRE BEHAVIOUR

(75) Inventors: Volker Stanjek, München (DE); Felicitas Schauer, Aying (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 1064 days.

This patent is subject to a terminal disclaimer.

(21) Appl. No.: 10/545,509

(22) PCT Filed: Apr. 8, 2004

(86) PCT No.: PCT/EP2004/003787

§ 371 (c)(1), (2), (4) Date: Aug. 12, 2005

(87) PCT Pub. No.: WO2004/092259

PCT Pub. Date: Oct. 28, 2004

(65) Prior Publication Data

US 2006/0148921 A1    Jul. 6, 2006

(30) Foreign Application Priority Data

Apr. 17, 2003   (DE) ................ 103 17 881

(51) Int. Cl.
*C08G 18/00* (2006.01)
*C08G 18/24* (2006.01)
*C08J 9/00* (2006.01)

(52) U.S. Cl. .................... 521/154; 521/131
(58) Field of Classification Search ......... 521/124, 521/154

See application file for complete search history.

(56) References Cited

U.S. PATENT DOCUMENTS

| 4,008,188 | A | * | 2/1977 | Alexander | ............... | 521/171 |
| 4,714,720 | A | | 12/1987 | Collin | | |
| 6,020,389 | A | | 2/2000 | Hoheneder | | |
| 6,414,045 | B1 | * | 7/2002 | Heimpel et al. | ........... | 521/130 |
| 6,552,097 | B1 | * | 4/2003 | Pauls et al. | .............. | 521/114 |
| 6,790,903 | B1 | * | 9/2004 | Majolo et al. | ............ | 524/506 |
| 7,067,563 | B2 | * | 6/2006 | Klein et al. | .............. | 521/154 |

FOREIGN PATENT DOCUMENTS

| DE | 101 08 038 | 1/2002 |
| DE | 101 08 039 | 11/2002 |
| DE | 101 39 132 | 2/2003 |

(Continued)

OTHER PUBLICATIONS

Solvay, IXOL M125, 2009.*

(Continued)

*Primary Examiner*—Mark Eashoo
*Assistant Examiner*—Liam J Heincer
(74) *Attorney, Agent, or Firm*—Brooks Kushman P.C.

(57) ABSTRACT

Foamable compositions which are free of isocyanates, which exhibit low shrinkage, low propensity toward crack formation, and which display good flammability resistance, are prepared from blowing agent-containing compositions of alkoxysilane-terminated prepolymers derived from a polyol component which contains one or more halogenated polyols.

20 Claims, 1 Drawing Sheet

FOREIGN PATENT DOCUMENTS

| | | |
|---|---|---|
| JP | 61-116627 | 5/1987 |
| WO | WO 00/04069 | 1/2000 |
| WO | WO-0035981 A1 * | 6/2000 |
| WO | WO-02/08296 A2 * | 1/2002 |
| WO | WO 02/066532 | 8/2002 |
| WO | WO 02066532 A1 * | 8/2002 |
| WO | WO 02/068491 | 9/2002 |

OTHER PUBLICATIONS

Derwent Abstract corresponding to WO 00/04069 [AN 2000-225102].

Derwent Abstract corresponding to DE 101 08 038 [AN 2002-056633].

Derwent Abstract corresponding to DE 101 08 039 [AN 2002-627650].

Derwent Abstract corresponding to WO 02/066532 [AN 2002-627650].

Derwent Abstract corresponding to WO 02/068491 [AN 2002-056633].

Derwent Abstract corresponding to DE 101 39 132 [AN 2003-504944].

\* cited by examiner

EXPANSIBLE MIXTURES DEVOID OF ISOCYANATES EXHIBITING IMPROVED FIRE BEHAVIOUR

CROSS-REFERENCE TO RELATED APPLICATION

This application claims priority to PCT Appln. No. PCT/EP2004/003787, filed Apr. 8, 2004, and to German application 10317881.3, filed Apr. 17, 2003.

BACKGROUND OF THE INVENTION

1. Field of the Invention

The invention relates to isocyanate-free foamable mixtures comprising prepolymers and a hydrocarbon blowing agent.

2. Description of the Related Art

Sprayable in-situ foams are employed for filling hollow spaces, in particular in the building sector. Here, they are used, inter alia, for sealing joins, e.g. around windows and doors, and act as excellent insulating materials so as to give good thermal insulation. Further applications are, for example, insulation of pipes or filling hollow spaces in industrial appliances with foam.

All conventional in-situ foams are polyurethane foams (PU foams) which in the uncrosslinked state comprise prepolymers which have a high concentration of free isocyanate groups. These isocyanate groups are able to undergo addition reactions with suitable reaction partners even at room temperature, as a result of which curing of the spray foam is achieved after application. The foam structure is produced by incorporating a volatile blowing agent into the as yet uncrosslinked raw material and/or by means of carbon dioxide formed by reaction of isocyanates with water. The foam is generally ejected from pressure cans by means of the autogenous pressure of the blowing agent.

Reaction partners employed for the isocyanates are alcohols having two or more OH groups, especially branched and unbranched polyols, or else water. The latter reacts with isocyanates to liberate carbon dioxide, as mentioned above, and form primary amines which can then add directly onto a further, as yet unconsumed isocyanate group. This results in formation of urethane and urea units which, owing to their high polarity and their ability to form hydrogen bonds in the cured material, can form partially crystalline substructures and thus lead to foams having a high hardness, pressure resistance and ultimate tensile strength.

Blowing agents used are mostly gases which are condensable at a relatively low pressure and can thus be mixed in the liquid state into the prepolymer mixture without the spray cans having to be subjected to excessively high pressures. In addition, the prepolymer mixtures contain further additives such as foam stabilizers, emulsifiers, flame retardants, plasticizers and catalysts. The latter are usually organic tin(IV) compounds or tertiary amines. However, iron(III) complexes, for example, are also suitable here.

PU spray foams are produced both as one-component (1K) foams and as two-component (2K) foams. The 1K foams cure exclusively through contact of the isocyanate-containing prepolymer mixture with atmospheric moisture. Foam formation can additionally be aided by the carbon dioxide liberated during the curing reaction of 1K foams. 2K foams comprise an isocyanate component and a polyol component which have to be mixed well with one another immediately before foaming and cure as a result of the reaction of the polyol with the isocyanates. An advantage of the 2K systems is an extremely short curing time. Thus, it sometimes only takes a few minutes for a 2K foam to cure to such an extent that it can be cut. However, 2K foams have the disadvantage that they require a complicated pressure can having two chambers and, in addition, are significantly less comfortable to handle than the 1K systems. The latter in particular has resulted in 1K foams being used considerably more frequently than 2K foams in Europe.

The cured PU foams display, in particular, excellent mechanical and thermal insulation properties. Furthermore, they have very good adhesion to most substrates and are stable virtually indefinitely under dry and UV-protected conditions. Further advantages are the toxicological acceptability of the cured foams from the point in time at which all isocyanate units have reacted quantitatively, and their swift curing and their easy handling. Due to these properties, PU foams have been found to be very useful in industrial practice.

A further important advantage of PU foams is the fact that their burning behavior can relatively easily be improved significantly by addition of flame retardants. Thus, for example, burning class B2 (normal combustibility) can be achieved without problems in the case of PU foams using customary flame retardants. In some countries, e.g. Germany, this burning class is prescribed by law for in-situ foams. As flame retardant, use is made, in particular, of tris(chloro-propyl) phosphate, usually in the form of technical-grade mixtures of the various regioisomers. This flame retardant is present virtually without exception in commercially available in-situ PU foams having improved burning behavior. The most important reason for this widespread use of tris(chloropropyl) phosphate is the fact that among liquid flame retardants there is at present no inexpensive alternative having comparable effectiveness. The often very effective solid flame retardants, on the other hand, are unsuitable for use in in-situ PU foams since they can block the valve during foaming. In particular, however, solid flame retardants can jam in the valve during the foaming procedure, so that the valve subsequently no longer closes, which leads to uncontrolled complete emptying of the foam can.

A disadvantage of tris(chloropropyl) phosphate as most widely used flame retardant for in-situ PU foams is the fact that it is not reactive and is therefore not incorporated into the network formed during curing of the foam. Although there is generally no risk of subsequent release of the unbound flame retardant in the case of in-situ foams because these foams are closed-cell and, in addition, are usually covered with plaster or render, this flame retardant reduces the network density as a result of the absence of chemical bonding to the PU polymer network and thus acts as plasticizer. Nevertheless, PU foams have, in this respect, the advantage that their hardness depends mainly on the concentration of the PU and urea units present in them. Thus, in particular, their ability to form hydrogen bonds is responsible for the good mechanical properties of PU foams. The plasticizing action of the flame retardant can therefore be compensated relatively readily by appropriate adaptation of the PU and urea group density in the cured foam. Since the PU and urea units are to a large measure formed only during curing of the foam and thus have no influence on the viscosity of the foamable mixture before curing, this measure can be employed without problems.

Despite all their advantages, PU spray foams have the critical disadvantage that the isocyanate groups can, owing to their high reactivity, also develop a serious irritant action and toxic effects. In addition, the amines which can be formed by reaction of monomeric diisocyanates with an excess of water are in many cases suspected of being carcinogenic. In fact, carcinogenic action has already been detected. Such monomeric diisocyanates are likewise present in addition to the isocyanate-terminated prepolymers in most spray foam mixtures. The uncrosslinked spray foam compositions are thus toxicologically unacceptable until they are completely cured. Critical factors here are not only direct contact of the prepolymer mixture with the skin but also, in particular, possible aerosol formation during application of the foam or vaporization of low molecular weight constituents, e.g. monomeric isocyanates. This results in the risk of toxico-logically unacceptable compounds being taken up via inhaled air. In addition, isocyanates have a considerable allergenic potential and can, inter alia, trigger asthma attacks. These risks are increased by the fact that the PU spray foams are often not used by trained and practiced users but by handymen and home workers, so that correct handling cannot always be assumed.

The hazard potential exhibited by conventional PU foams and the associated compulsory labeling has additionally resulted in the problem of considerably decreasing acceptance of the corresponding products by users. In addition, completely or partly emptied spray cans are classified as hazardous waste and have to be labeled accordingly and in some countries, e.g. Germany, even have to be made available for reuse by means of a costly recycling system.

In order to overcome these disadvantages, DE-A-43 03 848, inter alia, has described prepolymers for spray foams which contain no monomeric isocyanates or contain only low concentrations of these. However, a disadvantage of such systems is the fact that the prepolymers always still have isocyanate groups, so that such PU spray foams may well be better than conventional foams from a toxicological point of view but cannot be described as nonhazardous. In addition, the acceptance and waste problems are not solved by such foam systems.

It would therefore be desirable to have prepolymers which do not crosslink via isocyanate groups and are thus toxicologically acceptable available for the production of spray foams. Moreover, these prepolymer mixtures should make it possible to produce spray foams which in the cured state have similarly good properties and, in particular, a comparable hardness compared to conventional isocyanate-containing PU foams. In addition, one-component spray foam systems which cure exclusively through contact with atmospheric moisture also have to be possible. These should display comparably problem-free handling and processibility including a high curing rate even at a low catalyst concentration. The latter is important particularly since the organotin compounds generally used as catalysts are likewise problematical from a toxicological point of view. In addition, tin catalysts often also contain traces of highly toxic tributyltin derivatives. It would therefore be particularly advantageous to have a prepolymer system which has such favorable curing properties that a tin catalyst can be entirely dispensed with.

On this subject, the literature, e.g. US-A-6020389, describes condensation-crosslinking silicone foams which comprise alkoxy-, acyloxy- or oximo-terminated silicone prepolymers. Such foamable mixtures are in principle suitable for producing 1K foams which cure at room temperature only through atmospheric moisture. However, such systems comprising purely silicone-containing prepolymers can be used only for producing elastic flexible to semi-rigid foams. They are not suitable for producing rigid, nonbrittle in-situ foams. EP-1098920-A, DE-10108038-A and DE-10108039-A describe prepolymer mixtures comprising alkoxysilane-terminated prepolymers for producing rigid spray foams. These are polymers having an organic backbone which generally has a conventional polyurethane structure. In EP-1098920-A and DE-10108038-A, this organic backbone is formed by reaction of customary diisocyanates with polyols. Here, an appropriate excess of diisocyanates is used so that isocyanate-terminated prepolymers are obtained. These can then be reacted with 3-aminopropyltrimethoxysilane derivatives in a second reaction step to form the desired alkoxysilane-terminated polyurethane prepolymers. In DE-10108038-A, a specific reactive diluent is added to the silane-terminated prepolymers. DE-10108039-A describes a second process for preparing alkoxysilane-terminated prepolymers, in which these prepolymers are formed by reaction of hydroxy-functional polyols with 3-isocyanatopropyltrimethoxy-silane.

These alkoxysilane-terminated prepolymers and any reactive diluents present can condense with one another in the presence of a suitable catalyst and of water with elimination of methanol and as a result cure. The water can be added as such or can originate from contact with atmospheric moisture. Both 1K and 2K foams can thus be produced using such a system.

However, the alkoxysilane-terminated polyurethane prepolymers described in EP-1098920-A, DE-10108038-A and DE-10108039-A have, inter alia, the disadvantage of a relatively low reactivity toward atmospheric moisture. For this reason, high concentrations of a tin catalyst are necessary to achieve sufficiently rapid curing.

A significant improvement is provided by a system described in WO 02/066532. The alkoxysilane-terminated prepolymers described here for producing isocyanate-free spray foams comprise silane end groups of the general formula [1]

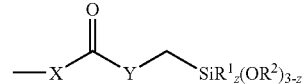

[1]

where:
X and Y are each an oxygen atom, an N—R' group or a sulfur atom,
$R^1$ is an alkyl, cycloalkyl, alkenyl or aryl radical having 1-10 carbon atoms,
$R^2$ is an alkyl radical having 1-2 carbon atoms or an ω-oxaalkylalkyl radical having a total of 2-10 carbon atoms,
R' is a hydrogen atom, an alkyl, alkenyl or aryl radical having 1-10 carbon atoms or a —$CH_2$—$SiR^1_z(OR^2)_{3-z}$ group and z is 0 or 1, with the proviso that at least one of the two groups X and Y is an NH function.

In these alkoxysilyl-terminated prepolymers, the crosslinkable alkoxysilyl groups are separated from a urethane or urea unit only by one methyl spacer. These prepolymers are astonishingly reactive toward water and thus have extremely short tack-free times in the presence of atmospheric moisture and can even be crosslinked in the absence of tin.

Two further critical disadvantages of silane-terminated prepolymers for spray foam applications could, on the other hand, be overcome in none of the patents or patent applications mentioned. Thus, all silane-crosslinking foams described in the prior art without exception display very ready combustibility. It is not possible to achieve a significant improvement in the burning behavior by the addition of flame retardants such as tris(chloropropyl) phosphate since, unlike in the case of conventional PU foams, the plasticizing action of these flame retardants cannot be compensated, or be compensated only unsatisfactorily, in the case of foams comprising alkoxysilane-terminated prepolymers. In this case, all PU and urea units which play a critical role in achieving the hardness of the resulting foam are already present in the prepolymer and have an effect on its viscosity. The concentrations of these groups can therefore be increased only to a very limited degree. As a consequence, the addition of relatively large amounts of flame retardants to silane-crosslinking spray foams according to the prior art leads without exception only to very soft, unstable foams. On the other hand, lower concentrations of flame retardants produce no appreciable effect.

The second disadvantage relates to the fact that cracks can form in known silane-crosslinking foams under certain conditions. This crack formation is particularly pronounced when the foam is foamed in a model join as shown in FIG. 1 whose wooden boards have been moistened beforehand. This crack formation is attributable to the polar blowing agents used in the prior art. This is because the diffusion of these polar blowing agents through the foam lamellae, which are likewise composed of polar material, proceeds significantly more quickly than the diffusion of nonpolar air occurring in the opposite direction. This can lead to shrinkage and subsequently even rupture of the only partially cured and thus not sufficiently cracking-resistant foam, because, unlike in the case of conventional PU foams, curing does not result in liberation of carbon dioxide which could compensate the blowing agent shrinkage until curing of the foam is concluded.

Crack formation can be avoided if nonpolar blowing agents such as propane/butane-containing mixtures are used, since nonpolar blowing agents diffuse significantly more slowly through the foam lamellae, so that the foam displays a considerably reduced tendency to shrink and to form cracks. However, a disadvantage of this measure is the fact that nonpolar blowing agents such as propane/butane are incompatible with the silane-terminated prepolymer. Although foamable emulsions can be produced using known prepolymers and propane/butane, these are not stable on storage and can no longer be foamed after demixing has occurred. Owing to the high viscosity of the silane-terminated prepolymers at room temperature, reemulsification is likewise not possible. For this reason, nonpolar blowing agents such as propane/butane can only be used in mixtures with other, more polar blowing agents. However, the known silane-crosslinking foams which then result are once again not crack-free in the moistened model join as shown in FIG. 1.

A criterion which can be used for a sufficient improvement in the burning behavior is spontaneous extinguishing of a vertical foam surface after brief application of a flame (5 s) to its bottom edge by means of a Bunsen burner, as shown in FIG. 2.

This combination of properties, viz. improved burning behavior and absence of cracks, means that numerous measures which in the case of conventional PU foams lead to a significant improvement in the burning behavior cannot be applied to alkoxysilane-crosslinking foams. In this context, mention may be made, for example, of the replacement of tolylene diisocyanate (TDI), which is present in silane-crosslinking foams corresponding to the prior art, by less combustible diphenylmethane diusocyanate (MDI) or polymeric MDI (p-MDI). Thus, the use of p-MDI as polyisocyanate leads to silane-terminated prepolymers which are totally incompatible with all customary blowing agents. Foaming of these prepolymers is not possible. Although the silane-terminated prepolymers obtained using MDI as diisocyanate display improved blowing agent solubility, they, too, are compatible only with blowing agent mixtures which consist essentially of polar blowing agents such as 1,1,1,2-tetrafluoroethane or 1,1-difluoroethane. It is in this case not possible to obtain foamable mixtures which remain crack-free in the moistened model join as shown in FIG. 1. For the same reason, it is likewise impossible to replace, completely or partly, the readily combustible polyether polyols present in foamable silane-terminated prepolymers according to the prior art by less combustible aromatic or aliphatic polyester polyols.

SUMMARY OF THE INVENTION

It was an object of the present invention to provide isocyanate-free prepolymer mixtures which are suitable for producing spray foams which remain crack-free and, in addition, display significantly improved burning behavior. These and other objects are met by providing a foamable composition containing isocyanate-free prepolymers having alkoxysilane end groups, where the prepolymers incorporate halogen-containing polyols, and a blowing agent.

DETAILED DESCRIPTION OF THE PREFERRED EMBODIMENTS

The invention provides isocyanate-free foamable mixtures (M) comprising (A) isocyanate-free, alkoxysilane-terminated prepolymers (A) which have silane end groups of the general formula [2]

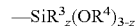

$$—SiR^3{}_z(OR^4)_{3-z} \qquad [2]$$

where $R^3$ is an alkyl, cycloalkyl, alkenyl or aryl radical having 1-10 carbon atoms, $R^4$ is an alkyl radical having 1-2 carbon atoms or an ω-oxaalkylalkyl radical having a total of 2-10 carbon atoms and z is 0 or 1, with halogen-containing polyols (A11) having been incorporated into the prepolymer (A) in the preparation of the prepolymers (A), and (B) blowing agents.

Figure 1:
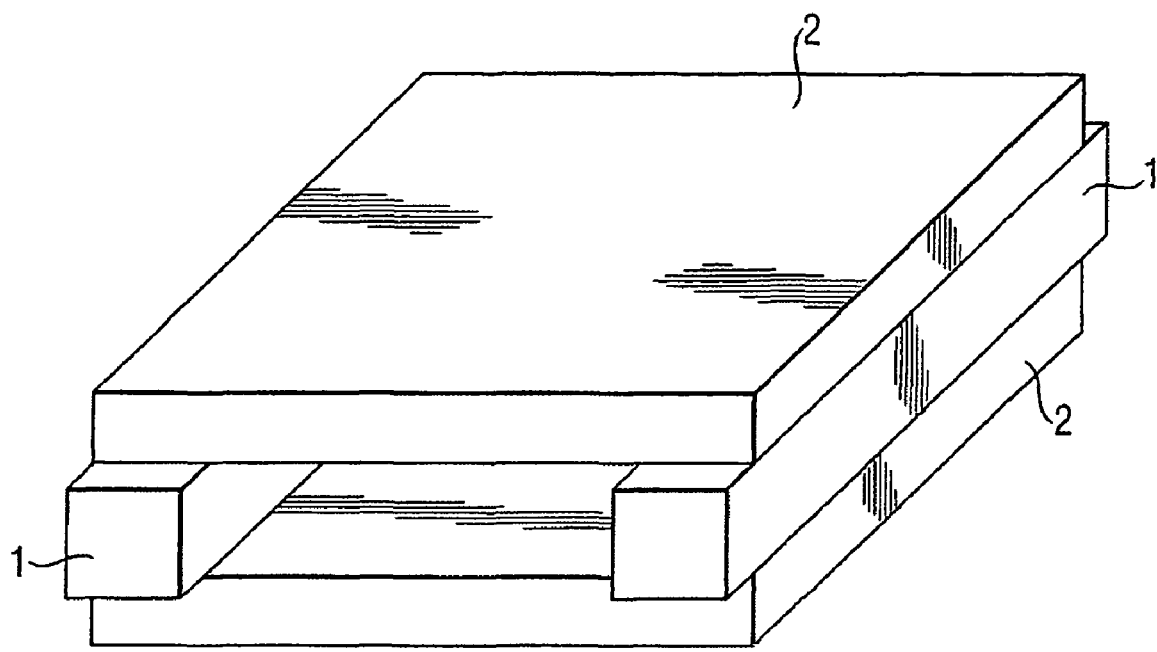
FIG. 1 illustrates a model join which can be used to evaluate in situ foams.

The isocyanate-free mixtures (M) are suitable for producing spray foams which remain crack-free even when foamed in the moistened model join as shown in FIG. 1. Thus, the silane-terminated prepolymers (A) display astonishingly good compatibility with blowing agent mixtures containing up to 50% by volume of propane/butane. The resulting foamable mixtures (M) can be foamed in the model join as shown in FIG. 1 to produce crack-free foams.

In addition, the prepolymers (A) have the surprising property that they can still be foamed in the model join as shown in FIG. 1 to produce crack-free foams even when blowing agent mixtures (B) containing at least 50% by volume of polar blowing agents such as 1,1,1,2-tetrafluoroethane or 1,1-difluoroethane in addition to nonpolar blowing agents are used. This was not to be expected because, in particular, all alkoxysilane-crosslinking spray foams corresponding to the prior art display significant crack formation when foamed under comparable conditions.

Figure 2:
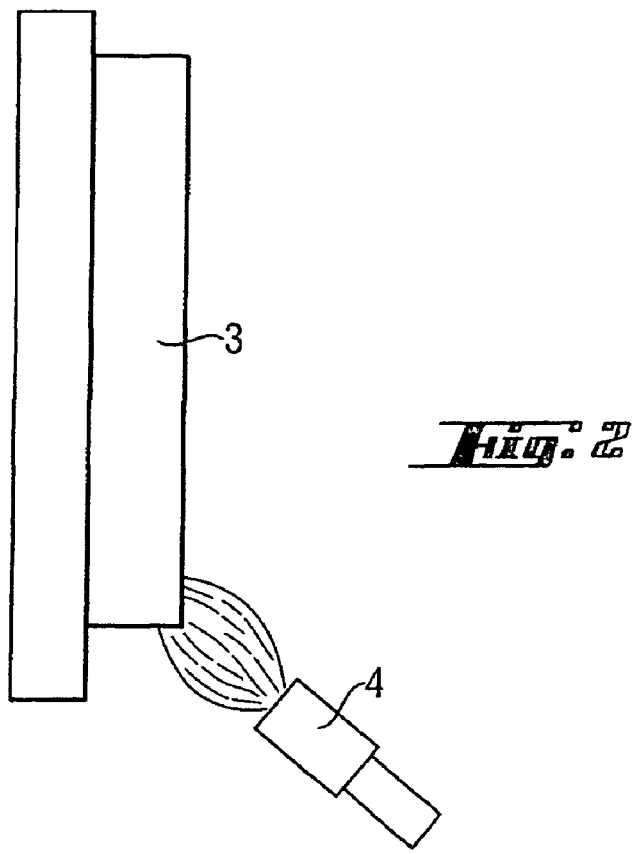
FIG. 2 illustrates a burning test which may be used to assess flammability characteristics of foam products.

The finished foams display considerably improved foaming behavior. If amounts customary for PU foams of 1-40% by weight, in particular 2-25% by weight, of flame retardants such as tris(chloropropyl) phosphate are additionally added to the foamable mixtures (M), the foams obtained, as shown in FIG. 2, extinguish spontaneously after brief application of a flame for 5 s to a vertical foam surface from its bottom edge by means of Bunsen burner.

Preference is given to isocyanate-free foamable mixtures (M) comprising prepolymers (A) according to the invention which have alkoxysilyl groups of the general formula [3]

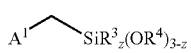

[3]

where
A$^1$ is an oxygen atom, an N—R$^5$ group or a sulfur atom,
R$^5$ is a hydrogen atom, an alkyl, cycloalkyl, alkenyl or aryl radical having 1-10 carbon atoms or a —CH$_2$—SiR$^3_z$(OR$^4$))$_{3-z}$ group and
R$^3$, R$^4$ and z are as defined in the case of the general formula [2].

Particular preference is given to alkoxysilyl groups of the general formula [3] in which the heteroatom A$^1$ is part of a urea or urethane unit.

Preferred radicals R$^3$ are methyl, ethyl or phenyl groups. The radicals R$^4$ are preferably methyl groups and preferred radicals R$^5$ are hydrogen, alkyl radicals having 1-4 carbon atoms, cyclohexyl and phenyl radicals.

Particular preference is given to isocyanate-free foamable mixtures comprising prepolymers (A) which have alkoxysilyl groups of the general formula [4]

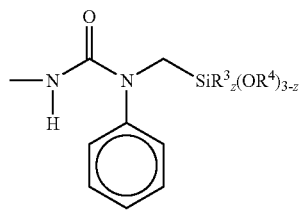

[4]

where R$^3$, R$^4$ and z are as defined in the case of the formula [2].

In a preferred embodiment of the invention, the mixtures (M) comprise prepolymers (A) in whose preparation the following components have been used:
10-70 parts of polyols or polyol mixtures (A1) consisting exclusively or partly of halogenated polyols (A11) and, if desired, further polyols (A12),
10-70 parts of diisocyanates and/or polyisocyanates (A2),
10-70 parts of organofunctional alkoxysilanes (A3) and
0-50 parts of further components.

In addition, the prepolymers (A) according to the invention can further comprise a reactive diluent (C).

This reactive diluent can be added to the prepolymers (A) during their synthesis.

The polyol component (A1) preferably comprises 20-100% by weight of halogenated polyols, with a content of 20-80% by weight, in particular 30-70% by weight, of halogenated polyols being particularly preferred.

The halogenated polyols (A11) preferably contain bromine and/or chlorine. They preferably have a mean molar mass of 100-4000 g/mol, more preferably a mean molar mass of 250-1000 g/mol. Preference is given here to polyols (A11) which have on average at least two, more preferably at least four halogen atoms in each halogenated polyol molecule.

In the prepolymers (A) having chain ends corresponding to the formula [3] or [4], the condensable alkoxysilyl groups are separated from a heteroatom only by one methylene spacer. As described, such prepolymers are very reactive toward water and thus have extremely short tack-free times in the presence of atmospheric moisture and can be crosslinked in the absence of tin.

As blowing agents (B), it is in principle possible to use all blowing gases known for spray foam applications and also mixtures thereof. Mention may here be made of, in particular, dimethyl ether, hydrocarbons having 1-5, preferably 3-5, carbon atoms, e.g. propane, butane, propane/butane mixtures, pentane or cyclopentane and also fluorinated hydrocarbons such as 1,1,1,2-tetrafluoroethane, 1,1-difluoroethane, 1,1,1,3,3-pentafluoropropane or 1,1,1,2,3,3,3-heptafluoropropane. However, the blowing agent (B) preferably comprises at least 10% by volume, particularly preferably at least 30% by volume, of hydrocarbons.

The main chains of the prepolymers (A) can be branched or unbranched. The mean chain lengths can be matched as desired to the properties desired in each case, e.g. viscosity of the uncrosslinked mixture and hardness of the finished foam. The main chains can be made up of not only the halogenated polyols (A11) but also further organic chain elements, e.g. polyalkanes, polyethers, polyesters, polycarbonates, polyurethanes, polyureas, vinyl acetate polymers or copolymers, and also organopolysiloxanes, e.g. dimethylorganopolysiloxanes or organosiloxane-polyurethane copolymers. Of course, any mixtures or combinations of prepolymers (A) having different main chains can also be used. It is likewise possible to use the prepolymers (A) in combination with further prepolymers having other main chains, e.g. chains comprising dimethylorganopolysiloxanes, organosiloxane-polyurethane copolymers or organic chains, e.g. polyalkanes, polyethers, polyesters, polycarbonates, polyurethanes, polyureas, vinyl acetate polymers or copolymers.

In a particularly preferred embodiment of the invention, the prepolymers (A) have a polyurethane nucleus. The preparation of these prepolymers (A) having a polyurethane nucleus preferably starts out from the following starting materials:
polyols or polyol mixtures (A1) consisting exclusively or partly of halogenated polyols (A11) and, if desired, further polyols (A12),
diisocyanates or polyisocyanates (A2),
alkoxysilanes (A3) which have either an isocyanate function or an isocyanate-reactive group.

As polyols (A11) for preparing the prepolymers (A) having a polyurethane nucleus, it is in principle possible to use all halogen-containing polymeric, oligomeric or monomeric alcohols having two or more OH functions and also mixtures thereof. Particularly suitable polyols (A11) are, in particular, halogen-substituted aromatic or aliphatic polyesters or halogen-substituted polyether polyols. Particular preference is given to halogenated polyether polyols which can be prepared, for example, by reacting chlorinated or brominated diols or oligools with epichlorohydrin. Suitable halogen-free polyols (A12) are aromatic and/or aliphatic polyester polyols and polyether polyols as are widely described in the literature. The polyethers and/or polyesters used can be either linear or branched. In addition, they can also have substituents such as halogen atoms. Hydroxy-alkyl-functional phosphoric esters/polyphosphoric esters can also be used as polyols (A1). The use of any mixtures of the various types of polyol is likewise possible.

In a preferred embodiment of the invention, a mixture of halogenated polyols (A11) and nonhalogenated polyether polyols (A1) is used as component (A1), with a mixture of halogenated polyols (A11), nonhalogenated polypropylene glycols and nonhalogenated polypropylene glycerols being particularly preferred.

Examples of useful diisocyanates (A2) are diisocyanato-diphenylmethane (MDI), both in the form of crude or technical-grade MDI and in the form of pure 4,4' or 2,4' isomers or mixtures thereof, tolylene diisocyanate (TDI) in the form of its various regioisomers, diisocyanatonaphthalene (NDI), isophorone diisocyanate (IPDI) and hexamethylene diisocyanate (HDI). Examples of polyisocyanates (A2) are polymeric MDI (P-MDI), triphenylmethane triisocyanate and biuret triisocyanates. The diisocyanates and/or polyiso-cyanates (A2) can be used individually or as mixtures. The aromatic isocyanates are preferably used as component (A2), with particular preference being given to TDI.

As alkoxysilanes (A3) for the preparation of the prepolymers (A) having a polyurethane nucleus, it is in principle possible to use all alkoxysilanes which have either an isocyanate function or an isocyanate-reactive group. The alkoxysilanes serve to incorporate the alkoxysilyl end groups into the prepolymers (A). As alkoxysilanes (A3), preference is given to using compounds which are selected from among silanes of the general formulae [5] and [6]

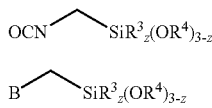

where

B is an OH, SH or NHR³ group and

R³, R⁴, R⁵ and z are as defined in the case of the general formula [3].

It is possible to use individual silanes (A3) or mixtures of various silanes (A3).

Particular preference is given to using silanes (A3) of the general formula [7]

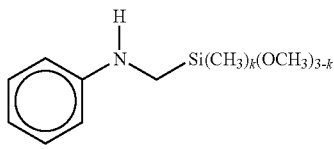

where k is 0, 1 or 2.

This silane can be prepared without problems in only one reaction step by reaction of chloromethyltrimethoxysilane or chloromethyldimethoxy-methylsilane with aniline, i.e. from very simple and inexpensive starting materials. When this silane is used, prepolymers (A) having alkoxysilyl end groups of the general formula [4] are obtained.

The prepolymers (A) can be prepared by simply combining the components described, if appropriate gradually, with a catalyst being able to be added and/or elevated temperature being able to be employed if appropriate. The isocyanate groups of the diisocyanates and/or polyisocyanates and, if present, the isocyanate groups of the silane of the general formula [5] in this way react with the OH or NH functions of the polyols added and the monomeric alcohols and, if present, with the OH or NH functions of the silanes of the general formulae [6] and/or [7].

The concentrations of all isocyanate groups participating in all reaction steps and all isocyanate-reactive groups and also the reaction conditions are selected so that all isocyanate groups react completely during the prepolymer synthesis. The finished prepolymer (A) is thus isocyanate-free. In a preferred embodiment of the invention, the concentration ratios and the reaction conditions are selected so that >80% of the chain ends, particularly preferably >90% of the chain ends, of the prepolymers (A) are terminated by alkoxysilyl groups of the general formula [2].

The prepolymers (A) having a polyurethane nucleus can be prepared in various ways. In principle, it is possible to place all components together in a reaction vessel and subsequently to start the reaction by addition of a catalyst or by heating. However, owing to the relatively large quantity of heat liberated in these reactions, it is usually advantageous to add the individual components gradually so as to be able to control the quantity of heat liberated more easily. The order and rate of addition of the individual components can be as desired. It is also possible to initially charge or add the various raw materials either individually or as mixtures. A continuous preparation of the prepolymers, e.g. in a tube reactor, is also conceivable in principle.

In a particularly preferred process for preparing the prepolymers, the isocyanate component (A2) comprising one or more different diisocyanates/polyisocyanates is placed in a reaction vessel and admixed with a deficiency of a polyol (A1) or a mixture of a plurality of polyols (A1). These two components react preferably at temperatures above 40° C. or in the presence of a catalyst to form an isocyanate-terminated prepolymer. This is subsequently admixed with one or more aminosilanes of the general formulae [6] and/or [7], with the concentrations being selected so that all isocyanate groups react. This results in a silane-terminated prepolymer. Purification or other work-up is not necessary.

Preference is likewise given to a process for preparing the foamable mixtures (M), in which the prepolymer synthesis is carried out entirely or at least partly in a pressure vessel, preferably in the foam can. In this case, the blowing agent and all further additives can also be added to the reaction mixture. In this way, the sometimes relatively highly viscous prepolymers (A) are produced in the presence of the blowing agent and a low-viscosity blowing agent/prepolymer solution or mixture is formed directly.

The reaction between isocyanate groups and isocyanate-reactive groups which occurs in the preparation of the prepolymers (A) can, if appropriate, be accelerated by means of a catalyst. Preference is in this case given to using the same catalysts which are described below as curing catalysts (D) for the in-situ foam. If appropriate, the same catalyst or the same combination of a plurality of catalysts which catalyzes the preparation of the prepolymer can also be used as curing catalyst (D) for foam curing. In this case, the curing catalyst (D) is already present in the finished prepolymer (A) and does not have to be added in the compounding of the foamable mixture (M).

In addition to the prepolymers (A) and the blowing agent (B), the mixtures (M) can further comprise any further (pre) polymers. These can likewise have reactive groups via which they are incorporated into the network being formed during curing of the foam. However, they can also be unreactive.

In addition to the prepolymers (A) and the blowing agent (B), the mixtures (M) can further comprise a low molecular weight reactive diluent (C). In this case, up to 100 parts by weight, preferably from 1 to 40 parts by weight, of a low molecular weight reactive diluent (C) which has a viscosity of not more than 5 Pas at 20° C. and has at least one $C_1$-$C_6$-alkoxysilyl group per molecule can be present in the mixture (M) per 100 parts by weight of prepolymer (A).

Suitable reactive diluents (C) are in principle all low molecular weight compounds which have a viscosity of preferably not more than 5 Pas, in particular not more than 1 Pas, at 20° C. and have reactive alkoxysilyl groups via which they can be incorporated into the three-dimensional network being formed during curing of the foam. The reactive diluent (C) serves, in particular, to reduce the viscosity of any relatively high-viscosity prepolymer mixtures (M). It can be added during the synthesis of the prepolymers (A) and can thus also prevent the occurrence of any intermediates which have a high viscosity and are therefore difficult to handle. The reactive diluent (C) preferably has a sufficiently high density (by weight) of crosslinkable alkoxysilyl groups for it to be able to be incorporated into the network being formed during curing without resulting in a decrease in the network density.

Preferred reactive diluents (C) are the inexpensive alkyltrimethoxysilanes such as methyltrimethoxysilane and also vinyltrimethoxysilane or phenyltrimethoxysilane and their partial hydrolysates. A further preferred reactive diluent is the carbamatosilane of the general formula [8]:

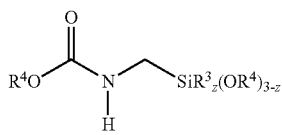

[8]

where $R^3$, $R^4$ and z are as defined in the case of the formula [3].

To achieve rapid curing of the foam at room temperature, a curing catalyst (D) can be added if appropriate. As already mentioned, it is here possible to use, inter alia, the organic tin compounds customarily used for this purpose, e.g. dibutyltin dilaurate, dioctyltin dilaurate, dibutyltin diacetylacetonate, dibutyltin diacetate or dibutyltin dioctoate, etc. Furthermore, it is also possible to use titanates, e.g. titanium(IV) isopropoxide, iron(III) compounds, e.g. iron(III) acetylacetonate, or amines, e.g. aminopropyltrimethoxysilane, N-(2-aminoethyl)-aminopropyltrimethoxysilane, triethylamine, tributylamine, 1,4-diazabicyclo[2.2.2]octane, 1,8-diazabicyclo-[5.4.0]undec-7-ene, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, etc. Organic Brønsted acids such as acetic acid, trifluoroacetic acid or benzoyl chloride, and also inorganic Brønsted acids, e.g. hydrochloric acid, phosphoric acid and its monoesters and/or diesters, for example butyl phosphate, (iso)propyl phosphate, dibutyl phosphate, are also suitable as catalysts [D]. However, numerous further organic and inorganic heavy metal compounds and organic and inorganic Lewis acids or bases can also be used for this purpose.

In addition, the crosslinking rate can also be increased further by means of a combination of various catalysts or of catalysts with various cocatalysts.

The isocyanate-free, foamable mixtures (M) can further comprise the customary additives such as foam stabilizers and cell regulators, thixotropes and/or plasticizers. As foam stabilizers, it is possible to use, in particular, the commercial silicone oligomers modified with polyether side chains. Additional flame retardants such as tris(chloropropyl) phosphate, triethyl phosphate, cresyl phosphate, chloroparaffins and any further halogen- and/or phosphorus-containing compounds can also be present.

The isocyanate-free foamable mixtures (M) can be used directly as one-component isocyanate-free spray foams. The spray foams are preferably stored in pressure vessels such as pressure cans.

All the symbols used in the formulae above have their meanings independently of one another in each case. In all formulae, the silicon atom is tetravalent.

Unless indicated otherwise, all quantities and percentages in the following examples are by weight, and all pressures are 0.10 MPa (abs.) and all temperatures are 20° C.

FIGS. 1 and 2 serve to illustrate some of the examples.

FIG. 1 depicts a model join which consists of 2 wooden boards (1) having the dimensions 1×15×15 cm and 2 plastic beams (2) having the dimensions 2×2×17 cm. FIG. 2 depicts the arrangement of foam specimen (3) and laboratory Bunsen burner (4) in the burning test. The vertical cut-open foam specimen (3) is attached to a support material. The Bunsen burner (4) is operated with an oxygen-rich flame and is held at the bottom edge of the foam specimen (3) for 5 s. The Bunsen burner (4) is here inclined at 45°.

Example 1

Preparation of N-phenylaminomethylmethyldimethoxysilane: 2095 g (22.5 mol) of aniline are placed in their entirety in a laboratory reactor and subsequently made inert by means of nitrogen. The aniline is heated to a temperature of 115° C. and 1159 g (7.5 mol) of chloromethylmethyldimethoxysilane are added dropwise over a period of 1.5 hours and the mixture is stirred for a further 30 minutes at 125-130° C. After addition of about 150 g of the silane, an increased amount of aniline hydrochloride precipitates as salt, but the suspension remains readily stirrable until completion of the addition.

The excess aniline is removed in a good vacuum (62° C. at 7 mbar). 1400 ml of n-heptane are subsequently added at room temperature and the suspension is stirred at 10° C. for 30 min in order to crystallize all the aniline hydrochloride. This is subsequently filtered off. The solvent n-heptane is removed at 60-70° C. in a partial vacuum. The residue is purified by distillation (89-91° C. at 0.16 mbar).

A yield of 1210 g, i.e. 76.5% of theory, is achieved at a product purity of about 94.5%. The product contains about 3.5% of N,N-bis[methyldimethoxysilylmethyl]-phenylamine as impurity.

Example 2

50.0 g (287.1 mmol) of tolylene 2,4-diisocyanate (TDI) are placed in a 250 ml reaction vessel provided with stirring, cooling and heating facilities and heated to about 80° C. The heating is then removed and a mixture of 40.27 g (172.3 mmol) of IXOL M 125® (brominated polyol from Solvay S. A) having an equivalent mass of 233.75 g/mol, 18.3 g (43.1 mmol) of a polypropylene glycol having a mean molar mass of 425 g/mol and 2.49 g (9.6 mmol) of a glycerol propoxylate having a mean molar mass of 260 g/mol is added at such a rate that the temperature does not rise to above 90° C. 10 ml of vinyltrimethoxysilane are then added as reactive diluent. After the addition is complete, the mixture is stirred at 70-80° C. for 30 minutes.

60.7 g (287.1 mmol) of N-phenylaminomethyldimethoxysilane are then added dropwise, 45 ml of tris(2-chloro-isopropyl) phosphate (Levagard PP®., Bayer A. G.) are added and the mixture is subsequently stirred at 70° C. for 120 minutes. Isocyanate groups could no longer be detected by IR spectroscopy in the resulting prepolymer mixture. A clear, dark brown prepolymer mixture which has a viscosity of 9.4 Pas at 50° C. and can be poured and processed further without problems at this temperature is obtained.

50 g of the prepolymer mixture obtained are weighed together with 1.2 g of foam stabilizer Siliconöl MSR 00046 (Wacker Chemie GmbH, Germany) and 0.2 g of benzoyl chloride into a pressure bottle with valve and 6 ml of 1,1,1,2-tetrafluoroethane (R 134) and 6 ml of propane/butane mixture (having a propane/butane ratio of 2:1) are added as blowing agent.

Discharge of this mixture gives a stiff, light-yellow foam which becomes tack-free after about 1 minute. After about 4 hours, the foam is solid enough to cut. When foaming is carried out in the model join as shown in FIG. 1, a crack-free foam is obtained. The cured foam has a high hardness.

When the burning test as shown in FIG. 2 is carried out, the foam extinguishes not more than 15 s after removal of the Bunsen burner.

Example 3

50.0 g (287.1 mmol) of tolylene 2,4-diisocyanate (TDI) are placed in a 250 ml reaction vessel provided with stirring, cooling and heating facilities and heated to about 80° C. The heating is then removed and a mixture of 40.27 g (172.3 mmol) of IXOL M 125® (brominated polyol from Solvay S. A) having an equivalent mass of 233.75 g/mol and 24.4 (57.4 mmol) of a polypropylene glycol having a mean molar mass of 425 g/mol is added at such a rate that the temperature does not rise to above 90° C. 5 ml of vinyltrimethoxysilane are then added as reactive diluent. After the addition is complete, the mixture is stirred at 70-80° C. for 30 minutes.

60.7 g (287.1 mmol) of N-phenylaminomethyldimethoxysilane are then added dropwise, 40 ml of tris(2-chloro-isopropyl) phosphate (Levagard PP®., Bayer A. G.) are added and the mixture is subsequently stirred at 70-80° C. for 120 minutes. Isocyanate groups could no longer be detected by IR spectroscopy in the resulting prepolymer mixture. A clear, dark brown prepolymer mixture which has a viscosity of 16.3 Pas at 50° C. and can be poured and processed further without problems at this temperature is obtained.

50 g of the prepolymer mixture obtained are weighed together with 1.2 g of foam stabilizer Siliconöl MSR 00046 (Wacker Chemie GmbH, Germany) and 0.2 g of benzoyl chloride into a pressure bottle with valve and 6 ml of 1,1,1,2-tetrafluoroethane (R 134) and 6 ml. of propane/butane mixture (having a propane/butane ratio of 2:1) are added as blowing agent.

Discharge of this mixture gives a stiff, light-yellow foam which becomes tack-free after about 1 minute. After about 4 hours, the foam is solid enough to cut. When foaming is carried out in the model join as shown in FIG. 1, a crack-free foam is obtained. The cured foam has a high hardness.

When a burning test as shown in FIG. 2 is carried out, the flame of a laboratory Bunsen burner is applied to the bottom edge of the vertical cut-open foam surface for 5 s. The Bunsen burner is inclined at 45° in this test. After removal of the Bunsen burner, the foam extinguishes after not more than 15 s.

Example 4

50.0 g (287.1 mmol) of tolylene 2,4-diisocyanate (TDI) are placed in a 250 ml reaction vessel provided with stirring, cooling and heating facilities and heated to about 80° C. The heating is then removed and a mixture of 40.27 g (172.3 mmol) of IXOL M 125® (brominated polyol from Solvay S. A) having an equivalent mass of 233.75 g/mol, 18.3 g (43.1 mmol) of a polypropylene glycol having a mean molar mass of 425 g/mol and 2.49 g (9.6 mmol) of a glycerol propoxylate having a mean molar mass of 260 g/mol is added at such a rate that the temperature does not rise to above 90° C. 10 ml of vinyltrimethoxysilane are then added as reactive diluent. After the addition is complete, the mixture is stirred at 70-80° C. for 30 minutes.

60.7 g (287.1 mmol) of N-phenylaminomethyldimethoxysilane (Levagard PP®., Bayer A. G.) are then added dropwise, 35 ml of tris(2-chloroisopropyl) phosphate are added and the mixture is subsequently stirred at 70-80° C. for 120 minutes. Isocyanate groups could no longer be detected by IR spectroscopy in the resulting prepolymer mixture. A clear, dark brown prepolymer mixture which has a viscosity of 18.0 Pas at 50° C. and can be poured and processed further without problems at this temperature is obtained.

50 g of the prepolymer mixture obtained are weighed together with 1.2 g of foam stabilizer Siliconöl MSR 00046 (Wacker Chemie GmbH, Germany) and 0.3 g of butyl phosphate as curing catalyst into a pressure bottle with valve and 10 ml of 1,1,1,2-tetrafluoroethane (R 134) and 6 ml of propane/butane mixture (having a propane/butane ratio of 2:1) are added as blowing agent.

Discharge of this mixture gives a stiff, light-yellow foam which becomes tack-free after about 10 minutes. After about 6 hours, the foam is solid enough to cut. When foaming is carried out in the model join 1, a crack-free foam is obtained. The cured foam has a high hardness.

When a burning test as shown in FIG. 2 is carried out, the flame of a laboratory Bunsen burner is applied to the bottom edge of the vertical cut-open foam surface for 5 s. The Bunsen burner is inclined at 45° in this test. After removal of the Bunsen burner, the foam extinguishes after not more than 15 s.

Comparative Example 1

24.6 g (141.2 mmol) of tolylene 2,4-diisocyanate (TDI) are placed in a 250 ml reaction vessel provided with stirring, cooling and heating facilities and heated to about 80° C. At this temperature, 30 g (70.6 mmol) of a polypropylene glycol having a mean molar mass of 425 g/mol are added under nitrogen at such a rate that the temperature does not rise to above 95° C. After the addition is complete, the mixture is stirred at 80° C. for 30 minutes.

The mixture is subsequently cooled to about 80° C. and 5 ml of vinyltrimethoxysilane are added as reactive diluent. 29.8 g (141.2 mmol) of N-phenylaminomethyl-dimethoxymethylsilane are then added dropwise and the mixture is subsequently stirred at 80° C. for 120 minutes. Isocyanate groups can no longer be detected by IR spectroscopy in the resulting prepolymer mixture. A clear, transparent prepolymer mixture which has a viscosity of 17.7 Pas at 50° C. and can be poured and processed further without problems at this temperature is obtained.

50 g of the prepolymer mixture obtained are weighed together with 1.2 g of foam stabilizer Siliconöl MSR 00046 (Wacker Chemie GmbH, Germany) and 0.3 g of benzoyl chloride into a pressure bottle with valve and 6 ml of 1,1,1,2-tetrafluoroethane (R 134) and 6 ml of propane/butane mixture (having a propane/butane ratio of 2:1) are added as blowing agent.

Discharge of this mixture gives a stiff, white foam which becomes tack-free after about 1 minute. After about 4 hours, the foam is solid enough to cut. When foamed in the model join as shown in FIG. 1, the foam displays significant crack formation. The cracks make up about 20-30% of the volume of the join. The cured foam has a high hardness.

When a burning test as shown in FIG. 2 on this foam specimen is carried out, the flame of a laboratory Bunsen burner is applied to the bottom edge of the vertical cut-open foam surface for 5 s. The Bunsen burner is inclined at 45° in this test. After removal of the Bunsen burner, the foam continues to burn extremely vigorously. The foam specimen burns away completely within a few minutes without being extinguished.

A further 50 g of the prepolymer mixture obtained are weighed together with 1.2 g of foam stabilizer Siliconöl MSR 00046 (Wacker Chemie GmbH, Germany), 0.3 g of benzoyl chloride and 5 g of tris(2-chloro-isopropyl)phosphate (Levagard PP®, Bayer A. G.) into a pressure bottle with valve and 6 ml of 1,1,1,2-tetrafluoroethane (R 134) and 6 ml of propane/butane (having a propane/butane ratio of 2:1) are added as blowing agent.

Discharge of this mixture gives a stiff, white foam which becomes tack-free after about 1 minute. The time to complete curing is about 4 hours. When foaming is carried out in the model join 1, the foam displays significant crack formation. The cracks make up about 20-30% of the volume of the join. The cured foam is only semi-rigid.

When a burning test as shown in FIG. 2 on this foam specimen is carried out, the flame of a laboratory Bunsen burner is applied to the bottom edge of the vertical cut-open foam surface for 5 s. The Bunsen burner is inclined at 45° in this test. After removal of the Bunsen burner, the foam continues to burn vigorously, without any significant effect of the flame retardant being able to be seen. The foam specimen burns away completely within a few minutes without being extinguished.

The addition of larger amounts of flame retardant (tris(2-chloroisopropyl) phosphate, Levagard PP®, Bayer A. G.) leads to a foamable mixture having a viscosity which is too low. After foaming, the resulting foam largely collapses before curing.

Comparative Example 2

24.6 g (141.2 mmol) of tolylene 2,4-diisocyanate (TDI) are placed in a 250 ml reaction vessel provided with stirring, cooling and heating facilities and heated to about 80° C. At this temperature, 42 g (98.8 mmol) of a polypropylene glycol having a mean molar mass of 425 g/mol are added under nitrogen at such a rate that the temperature does not rise to above 95° C. After the addition is complete, the mixture is stirred at 80° C. for 30 minutes.

The mixture is subsequently cooled to about 80° C. and 15 ml of vinyltrimethoxysilane are added as reactive diluent. 20.5 g (90.3 mmol) of N-phenylaminomethyl-dimethoxymethylsilane are then added dropwise, 20 ml of tris(2-chloroisopropyl) phosphate (Levagard PP®, Bayer A. G.) are added and the mixture is stirred at 80° C. for 120 minutes. Isocyanate groups can no longer be detected by IR spectroscopy in the resulting prepolymer mixture. A clear, transparent prepolymer mixture which has a viscosity of 29.6 Pas and can be poured moderately readily at this temperature and can be processed further only with difficulty is obtained.

50 g of the prepolymer mixture obtained are weighed together with 1.2 g of foam stabilizer Siliconöl MSR 00046 (Wacker Chemie GmbH, Germany) and 1.5 g of AMS (Wacker Chemie GmbH, Germany) into a pressure bottle with valve and 12 ml of 1,1,1,2-tetrafluoroethane (R 134) are added as blowing agent.

Discharge of this mixture gives a stiff, white foam which becomes tack-free after about 1 minute. After about 4 hours, the foam is solid enough to cut. When foamed in the model join as shown in FIG. 1, the foam displays very significant crack formation. The cracks make up over 50% of the volume of the join. The cured foam is soft.

When a burning test as shown in FIG. 2 on this foam specimen is carried out, the flame of a laboratory Bunsen burner is applied to the bottom edge of the vertical cut-open foam surface for 5 s. The Bunsen burner is inclined at 45° in this test. After removal of the Bunsen burner, the foam continues to burn despite the significantly increased content of flame retardant. The foam specimen burns away completely within a few minutes without being extinguished.

The addition of larger amounts of flame retardant (tris(2-chloroisopropyl) phosphate, Levagard PP®, Bayer A. G.) leads to an extremely soft foam. This is not dimensionally stable even after complete curing, but instead shrinks to a fraction of its original volume in subsequent days as a result of blowing agent diffusion.

Comparative Example 3

35.3 g (141.2 mmol) of diphenylmethane diisocyanate (MDI) are placed in a 250 ml reaction vessel provided with stirring, cooling and heating facilities and heated to about 60° C. At this temperature, 30 g (70.6 mmol) of a polypropylene glycol having a mean molar mass of 425 g/mol are added at such a rate under nitrogen that the temperature does not rise to above 75° C. After the addition is complete, the mixture is stirred at 60° C. for 30 minutes.

6 ml of vinyltrimethoxysilane are then added as reactive diluent and 29.8 g (141.2 mmol) of N-phenylaminomethyldimethoxymethylsilane are added dropwise and the mixture is subsequently stirred at 60° C. for 180 minutes. Isocyanate groups could no longer be detected by IR spectroscopy in the resulting prepolymer mixture. A turbid, white prepolymer mixture which has a viscosity of 12.1 Pas at 50° C. and can be poured and processed further at this temperature is obtained.

50 g of the prepolymer mixture obtained are weighed together with 1.2 g of foam stabilizer Siliciconöl MSR 00046 (Wacker Chemie GmbH, Germany) and 0.2 g of benzoyl chloride into a pressure bottle with valve and 12 ml of 1,1,1,2-tetrafluoroethane (R 134) are added as blowing agent.

Foaming of this prepolymer mixture by means of a blowing agent mixture of 1,1,1,2-tetrafluoroethane (R 134) and propane/butane as in examples 2-4 is not possible since this blowing agent mixture does not dissolve in the prepolymer. Corresponding emulsions are not stable on storage and after demixing can neither be foamed nor be reemulsified at room temperature.

Discharge of this mixture gives a stiff, white foam which becomes tack-free after about 1 minute. After about 4 hours, the foam is solid enough to cut. When foamed in the model join as shown in FIG. 1, the foam displays very significant crack formation. The cracks make up over 50% of the volume of the join. The cured foam is hard.

When a burning test as shown in FIG. 2 on this foam specimen is carried out, the flame of a laboratory Bunsen burner is applied to the bottom edge of the vertical cut-open foam surface for 5 s. The Bunsen burner is inclined at 45° in this test. After removal of the Bunsen burner, the foam continues to burn slowly. The foam specimen burns away completely without being extinguished.

Comparative Example 4

24.6 g (141.2 mmol) of tolylene 2,4-diisocyanate (TDI) are placed in a 250 ml reaction vessel provided with stirring, cooling and heating facilities and heated to about 80° C. At this temperature, a mixture of 15.0 g (70.6 mmol) of a polypropylene glycol having a mean molar mass of 425 g/mol and 13.06 g of Stepanopol 2402® having an equivalent mass of 370 g/mol is added under nitrogen at such a rate that the temperature does not rise to above 95° C. After the addition is complete, the mixture is stirred at 80° C. for 30 minutes.

5 ml of vinyltrimethoxysilane are then added as reactive diluent. 29.8 g (141.2 mmol) of N-phenylaminomethyldimethoxymethylsilane are then added dropwise, 15 ml of tris(2-chloroisopropyl) phosphate (Levagard PP®, Bayer A. G.) are added and the mixture is subsequently stirred at 80° C. for 180 minutes. Isocyanate groups can no longer be detected by IR spectroscopy in the resulting prepolymer mixture. A clear, transparent polymer mixture which has a viscosity of 15.24 Pas at 50° C. and can be poured and processed further at this temperature is obtained.

50 g of the prepolymer mixture obtained are weighed together with 1.2 g of foam stabilizer Tegostab® B 8443 (Goldschmidt A. G.) and 0.5 g of Jeffcat Z F 20® (Huntsman LLC) into a pressure bottle with valve and 12 ml of 1,1,1,2-tetrafluoroethane (R 134) are added as blowing agent.

Foaming of this prepolymer mixture by means of a blowing agent mixture of 1,1,1,2-tetrafluoroethane (R 134) and propane/butane as in examples 2-4 is not possible, since this blowing agent does not dissolved dissolve in the prepolymer. Corresponding emulsions are not stable on storage and after demixing can neither be foamed nor be reemulsified at room temperature.

Discharge of this mixture gives a stiff, white foam which becomes tack-free after about 1 minute. After about 4 hours, the foam is solid enough to cut. When foaming is carried out in the model join as shown in FIG. 1, the foams display significant crack formation. The cracks make up 40-50% of the volume of the join. The cured foam is hard.

When a burning test as shown in FIG. 2 on this foam specimen is carried out, the flame of a laboratory Bunsen burner is applied to the bottom edge of the vertical cut-open foam surface for 5 s. The Bunsen burner is inclined at 45° in this test. After removal of the Bunsen burner, the foam continues to burn. The foam specimen burns away completely without being extinguished.

The invention claimed is:

1. A one component moisture-curable isocyanate-free foamable composition, comprising:
(A) at least one isocyanate-free, alkoxysilane-terminated prepolymer having silane end groups of the formula 3

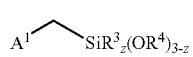

[3]

where
A$^1$ is an oxygen atom, an N—R$^5$ group or a sulfur atom,
R$^5$ is a hydrogen atom, an alkyl, cycloalkyl, alkenyl or aryl radical having 1-10 carbon atoms, or a —CH$_2$—SiR$^3_z$(OR$^4$)$_{3-z}$ group,
R$^3$ is an alkyl, cycloalkyl, alkenyl or aryl radical, having 1-10 carbon atoms,
R$^4$ is an alkyl radical having 1-2 carbon atoms or an ω-oxaalkylalkyl radical having a total of 2-10 carbon atoms and
z is 0 or 1,
wherein said prepolymer incorporates a polyol component comprising at least one halogen-containing polyol, said halogenated polyol containing on average at least four halogen atoms in each halogenated polyol molecule and
(B) at least one blowing agent comprising a mixture of hydrocarbons having 3 to 5 carbon atoms and a polar fluorinated hydrocarbon blowing agent present in 50 weight percent or more based on the weight of the blowing agent, and
wherein a foam prepared from the composition is free of cracks when foamed in a model join which consists of 2 wooden boards having the dimensions 1×15×15 cm and 2 plastic beams having the dimensions 2×2×17 cm.

2. The composition of claim 1, wherein the A$^1$ in the formula [3] is part of a urea or urethane unit.

3. The composition of claim 1, which comprises prepolymers in whose preparation the following components have been used:
a) 10-70 parts of a polyol component containing halogenated polyols, and optionally, further, non-halogenated polyols,
b) 10-70 parts of diisocyanates and/or polyisocyanates, and
c) 10-70 parts of organofunctional alkoxysilanes,
these parts being parts by weight exclusive of other composition components.

4. The composition of claim 3, wherein component b) consists of tolylene diisocyanate.

5. The composition of claim 3, wherein the polyol component comprises 20-100% by weight of halogenated polyols.

6. The composition of claim 2, which comprises prepolymers in whose preparation the following components have been used:
a) 10-70 parts of a polyol component containing halogenated polyols, and optionally, further, non-halogenated polyols,
b) 10-70 parts of diisocyanates and/or polyisocyanates, and
c) 10-70 parts of organofunctional alkoxysilanes,
these parts being parts by weight exclusive of other composition components.

7. The composition of claim 1, wherein the halogen substituents of the halogenated polyols are selected from the group consisting of bromine, chlorine, and mixtures thereof.

8. The composition of claim 1, which is free of an effective moisture cure promoting amount of tin-containing condensation catalysts.

9. The composition of claim 8, which comprises prepolymers in whose preparation the following components have been used:
a) 10-70 parts of a polyol component containing halogenated polyols, and optionally, further, non-halogenated polyols,
b) 10-70 parts of diisocyanates and/or polyisocyanates, and
c) 10-70 parts of organofunctional alkoxysilanes,
these parts being parts by weight exclusive of other composition components.

10. The composition of claim 1, wherein z is 1.

11. The composition of claim 1, wherein $R^3$ and $R^4$ are methyl.

12. The composition of claim 1, wherein the prepolymer of the alkoxysilane-terminated prepolymer consists of a polyurethane prepolymer prepared by reacting:
    a) one or more polyether polyols, at least one of which is halogenated, with
    b) at least one di- or polyisocyanate.

13. The composition of claim 12, wherein component b) consists of toluene diisocyanate.

14. A process for preparing the foamable composition of claim 1, wherein the prepolymer is prepared at least partly in a pressure vessel.

15. The process of claim 14, wherein the prepolymer is prepared completely in the same pressure vessel from which the foamable composition will be exuded.

16. A pressure vessel containing a foamable composition of claim 1.

17. A pressure vessel containing a foamable composition of claim 8.

18. A pressure vessel containing a foamable composition of claim 2.

19. A pressure vessel containing a foamable composition of claim 3.

20. A pressure vessel containing a foamable composition of claim 5.

* * * * *